(12) United States Patent
Daugherty

(10) Patent No.: US 7,800,869 B1
(45) Date of Patent: Sep. 21, 2010

(54) APPARATUS AND METHOD FOR POWER SUPPLY OVERVOLTAGE DISCONNECT PROTECTION

(75) Inventor: Kevin Michael Daugherty, Brighton, MI (US)

(73) Assignee: National Semiconductor Corporation, Santa Clara, CA (US)

( * ) Notice: Subject to any disclaimer, the term of this patent is extended or adjusted under 35 U.S.C. 154(b) by 57 days.

(21) Appl. No.: 11/845,691

(22) Filed: Aug. 27, 2007

(51) Int. Cl.
*H02H 3/22* (2006.01)

(52) U.S. Cl. .......................................... 361/18; 361/111

(58) Field of Classification Search .................... 361/18, 361/86, 87, 91.1, 111
See application file for complete search history.

(56) References Cited

U.S. PATENT DOCUMENTS

| | | | |
|---|---|---|---|
| 4,008,418 A | 2/1977 | Murphy | |
| 4,764,839 A * | 8/1988 | Laud | 327/143 |
| 5,130,883 A | 7/1992 | Edwards | |
| 5,463,521 A | 10/1995 | Love | |
| 5,585,991 A | 12/1996 | Williams | |
| 5,793,127 A | 8/1998 | Qualich | |
| 6,331,767 B1 | 12/2001 | Davies et al. | |
| 6,606,227 B2 | 8/2003 | Rapsinski et al. | |
| 6,781,316 B2 * | 8/2004 | Oda | 315/88 |
| 6,998,818 B2 * | 2/2006 | Xiong et al. | 320/134 |
| 7,161,338 B2 * | 1/2007 | Jiang et al. | 323/272 |
| 7,405,495 B2 * | 7/2008 | Guillarme et al. | 307/82 |
| 2008/0266739 A1 * | 10/2008 | Migliavacca | 361/91.1 |

OTHER PUBLICATIONS

LMV431/LMV431A/LMV431B Low-Voltage (1.24V) Adjustable Precision Shunt Regulators, National Semiconductor Corporation, May 2005, 16 pgs.
LMS33460 3V Under Voltage Detector, National Semiconductor Corporation, Mar. 2001, 6 pgs.
Yamamoto, S. et al., "Electrical Environmental Characteristics for Automotive Electronic Systems," IEEE Transactions on Vehicular Technology, vol. VT-32, No. 2, May 1983, pp. 151-160.
Over Voltage Protection Circuit for Automotive Load Dump, Application Note 1533, National Semiconductor Corporation, Dec. 2006, pp. 6.
Micro SMD Wafer Level Chip Scale Package, Application Note 1112, National Semiconductor Corporation, Jun. 2007, pp. 1-12.
U.S. Appl. No. 11/845,678, filed Aug. 27, 2007, "Apparatus and Method for Input Voltage Transient Protection With a Low-Voltage Reset Circuit".
Efland, T R et al., "Load dump[autombiles]", Electronic Applications in Transportation, 1990., IEEE Workshop on, pp. 73-78.

* cited by examiner

*Primary Examiner*—Danny Nguyen
(74) *Attorney, Agent, or Firm*—Frommer Lawrence & Haug LLP; Matthew M. Gaffney

(57) ABSTRACT

A circuit for voltage transient protection is provided. The circuit includes an input monitor circuit, an input transistor, and a voltage regulator. The input transistor is connected between the input voltage and the input voltage terminal of the voltage regulator. The input monitor circuit asserts an input monitor circuit output signal if the input voltage reaches a pre-determined level. When the input monitor circuit output signal is asserted, and gate and source of the input transistor are shorted together (to disconnect the input of the voltage regulator from the input voltage), and the voltage regulator is disabled.

21 Claims, 8 Drawing Sheets

APPARATUS AND METHOD FOR POWER SUPPLY OVERVOLTAGE DISCONNECT PROTECTION

FIELD OF THE INVENTION

The invention is related to transient protection/suppression, and in particular but not exclusively, to a method and circuit for disconnecting input power from a regulator in an automotive electronic system when a load dump or other voltage spike occurs on the battery line.

BACKGROUND OF THE INVENTION

Over-voltage conditions can damage electronic devices, including transistors, regulators, and loads. High-voltage transient devices such as for automotive often use devices capable of operating with high voltages, so that the devices are not damaged during high voltage transients, such as load dump conditions.

A load dump condition may occur in an automobile due to an abrupt change in alternator load. For example, headlights being turned off, or the battery being disconnected from the battery post by a shock or mechanical vibration, may cause a load dump condition. The load dump condition may cause a large increase in voltage. The battery line, normally having a voltage of around 12 Volts, may have a voltage spike going to 50V or more during the load dump condition. To accommodate such high voltage spikes, devices capable of operating at such voltages may be used. However, such high-voltage devices are typically significantly more expensive and/or limited in availability.

BRIEF DESCRIPTION OF THE DRAWINGS

Non-limiting and non-exhaustive embodiments of the present invention are described with reference to the following drawings, in which.

DETAILED DESCRIPTION

Figure 1:
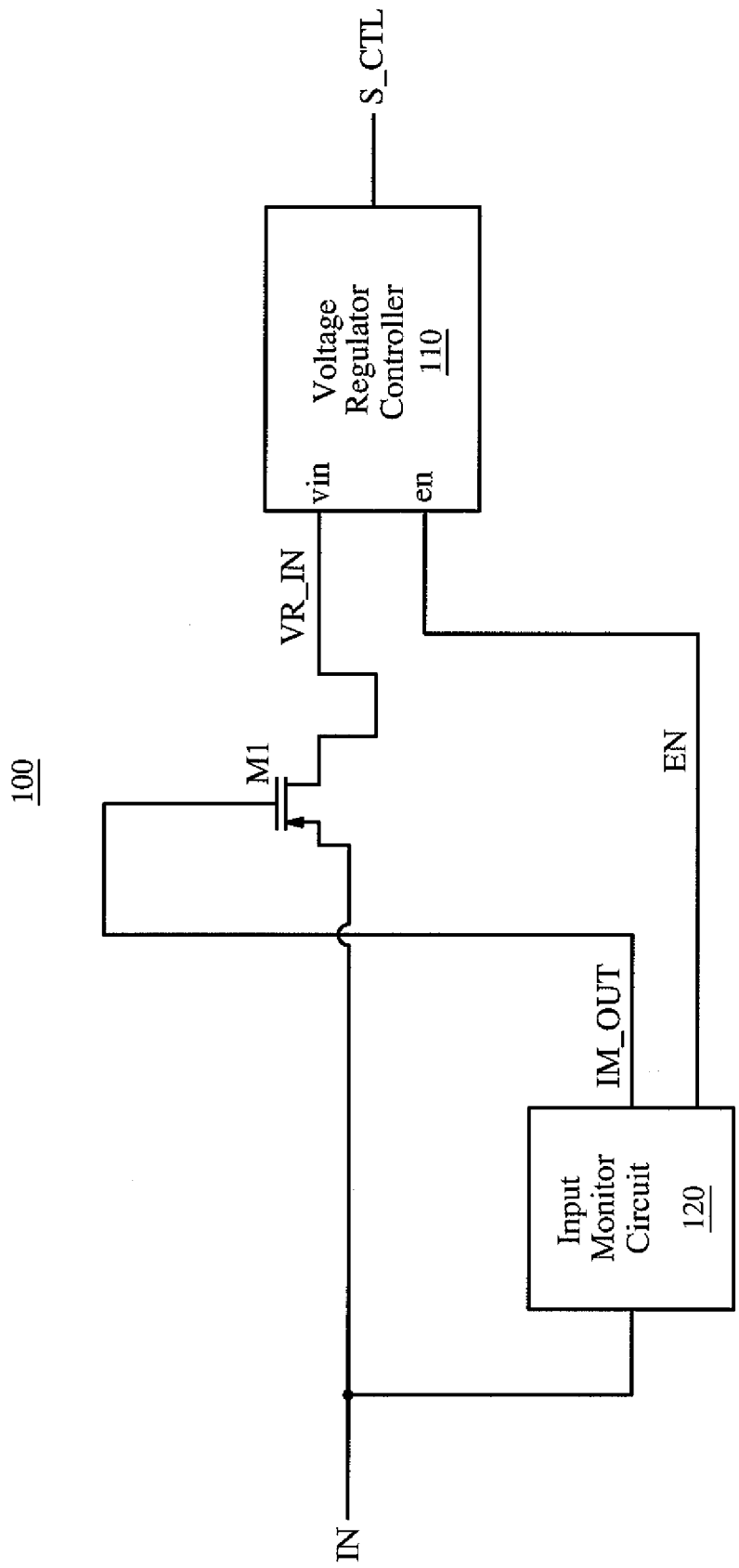
FIG. 1 shows a block diagram of an embodiment of a circuit, arranged in accordance with aspects of the present invention.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a circuit for voltage transient protection. The circuit includes an input monitor circuit, an input transistor, and a voltage regulator. The input transistor is connected between the input voltage and the input voltage terminal of the voltage regulator. The input monitor circuit asserts an input monitor circuit output signal if the input voltage reaches a pre-determined level. When the input monitor circuit output signal is asserted, and gate and source of the input transistor are shorted together (to disconnect the input of the voltage regulator from the input voltage), and the voltage regulator is disabled.

FIG. 1 shows a block diagram of an embodiment of circuit 100. Circuit 100 includes transistor M1, voltage regulator controller 110, and input monitor circuit 120.

Transistor M1 is an input transistor that is coupled between input voltage IN and the voltage input (vin) of voltage regulator controller 110. In one embodiment, input voltage IN is the battery voltage line for an automobile. However, the invention is not so limited, and may also be suitably employed in virtually any high voltage transient environment, such as industrial applications or the like.

Figure 4:
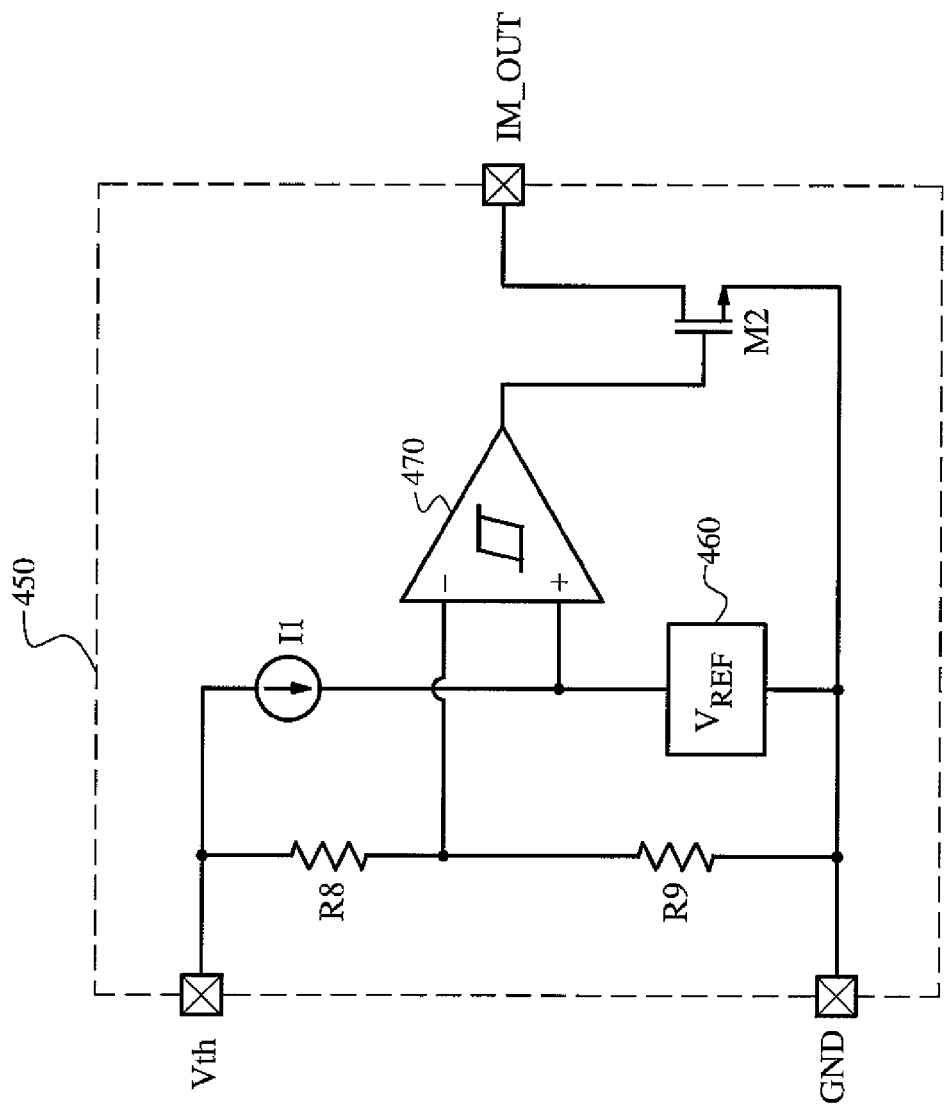
FIG. 4 illustrates a block diagram of an embodiment of the low-voltage reset circuit of FIG. 3.

Input monitor circuit 120 is arranged to monitor voltage IN. If voltage IN reaches a pre-determined level (which may be adjusted by hysteresis), input monitor circuit 120 asserts input monitor circuit output signal IM_OUT, which in turns causes input transistor M1, which operates as a switch, to open (transistor M1 may however break down, and therefore no longer operate as an open switch, if input voltage IN exceeds the voltage rating of transistor M1). In one embodiment, input transistor M1 is opened by shorting the gate of transistor M1 to the source of transistor M1. In other embodiments, opening input transistor M1 may be accomplished in other suitable ways. In one embodiment, input monitor circuit 120 includes a low-voltage reset circuit that asserts signal IM_OUT when the low-voltage reset circuit leaves the reset state (as shown in FIG. 4 in one embodiment). However, the invention is not so limited, and some embodiments of input monitor circuit 120 do not include a low-voltage reset circuit. Other embodiments may use a high-voltage reset circuit, monitor logic, adjustable shunt regulator, a discrete comparator and voltage reference, and/or the like.

Voltage regulator controller 110 is arranged to control conversion of voltage regulator input voltage VR_IN into regulated output voltage Vout (not shown in FIG. 1). More specifically, voltage regulator controller 110 provides switch control signal S_CTL to control the regulation. In other embodiments, voltage regulator controller 110 may be a linear regulator controller rather than a switching regulator controller.

In circuit 100, voltage regulator controller 110 also has an enable input (en) that is coupled to input monitor circuit 120. In circuit 100, input monitor circuit 120, in addition to controlling input transistor M1, also disables voltage regulator controller 110 when the input voltage reaches the pre-determined level.

In one embodiment, when input voltage IN reaches the pre-determined level, the gate and source of transistor M1 are shorted together, causing transistor M1 to operate as an open switch. However, if the voltage limit of transistor M1 is reached, transistor M1 breaks down, and operates essentially as a zener diode. However, by disabling voltage regulator controller 110, no current passes through transistor M1, and there is accordingly substantially no power through transistor M1. In this way, transistor M1 is not damaged even though it is in voltage breakdown.

In circuit 100, if input voltage Vin reaches the pre-determined level, the input voltage is disconnected from voltage regulator controller 110, and the voltage regulator controller is disabled so that no current is drawn through transistor M1 even if it is in voltage breakdown. It is not sufficient merely to disable voltage regulator controller 110 by disconnecting Vin, because that will not stop current from flowing through transistor M1 if transistor M1 is in voltage breakdown.

This topology potentially allows a voltage protection with twice the voltage limit of transistor M1. For example, a 30V part may be used for transistor M1, and provide 60V over-voltage protection. Or a 50V part may be used for transistor M1, and a 30V rated regulator to provide 80V over-voltage protection.

In one embodiment, as illustrated in FIG. 1, the input transistor M1 is a P-channel MOSFET transistor. However, the invention is not so limited, and other embodiments of input transistor M1 are within the scope and spirit of the invention.

Although FIG. 1 illustrates an embodiment in which voltage regulator controller 110 is disabled by de-asserted the signal at the enable pin of voltage regulator controller 110, the invention is not so limited, and other ways of disabling voltage regulator controller 110 are within the scope and spirit of the invention. For example, in one embodiment, voltage regulator controller 110 is disabled by forcing the regulator voltage feedback pin high. This embodiment and others are within the scope and spirit of the invention. Any suitable method for shutting off the voltage regulator may be employed, so long as the method prevents current from passing through input transistor M1 even when input transistor M1 is in voltage breakdown. Simply disconnecting the input is not sufficient, because it does not prevent current from passing through the input transistor even when the input transistor is in voltage breakdown.

Figure 2:
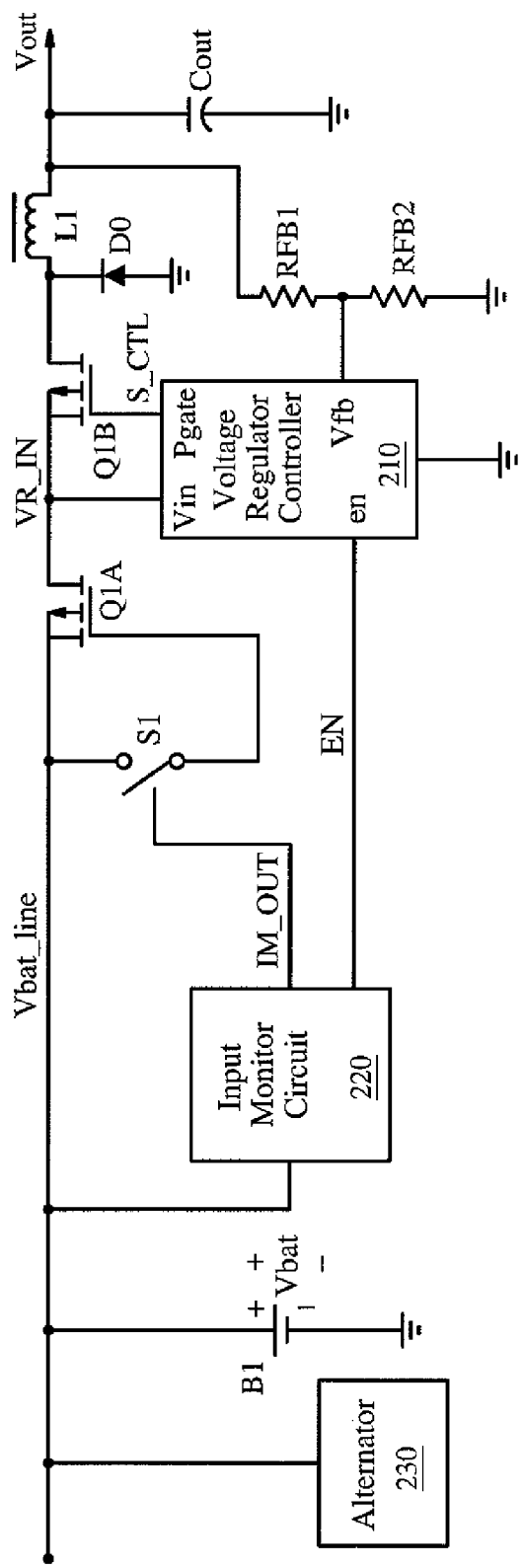
FIG. 2 illustrates a block diagram of an embodiment of the circuit of FIG. 1 illustrating one context for the circuit of FIG. 1, arranged in accordance with aspects of the present invention.

FIG. 2 shows a block diagram of an embodiment of circuit 200, which illustrates an automotive context for an embodiment of circuit 100 of FIG. 1.

Circuit 200 further includes alternator 230, battery B1, switch S1, transistor Q1B, diode D0, capacitor Cout, resistor RFB1, and resistor RFB2. Transistor Q1A is an embodiment of transistor M1 of FIG. 1. Voltage regulator controller 210, in conjunction with transistor Q1B, diode D0, inductor L1, capacitor Cout, resistor RFB1, and resistor RFB2, operate together as a buck switching regulator, which converts voltage VR_IN to regulated output voltage Vout. Transistor Q1B is a high-side switch for the buck switching regulator. Voltage regulator 210 includes pin Pgate to provide switch control signal S_CTL to control high-side switch transistor Q1B.

In operation, voltage Vout is provided to power electronic circuits in an automobile that control loads such as headlights, seat motors, other motors, fans, and the like. Alternator 230 and battery B1 are connected to the battery line. Battery B1 provides battery voltage Vbat. The voltage on the battery line is battery line voltage Vbat_line. Battery line voltage Vbat_line is an embodiment of voltage Vin of FIG. 1. If battery B1 is disconnected from the battery line, a load dump condition may occur, causing a voltage spike on batteryline voltage Vbat_line. If voltage Vbat_line exceeds a pre-determined voltage level (19.25 V in one embodiment), then input monitor circuit 220 asserts signal IM_OUT, causing switch S1 to close, and de-asserts signal EN, causing voltage regulator controller 210 to be disabled while voltage Vbat_line remains above the pre-determined level. In one embodiment, signals IM_OUT and signal EN are the same signal. In other embodiments, they are different signals.

In one embodiment, voltage regulator controller 210 is included on an integrated circuit. In one embodiment, voltage regulator controller 210 is included on an integrated circuit, and the other components of the voltage regulator are off-chip. However, in other embodiments, some of the other components of the voltage regulator may be included on the integrated circuit that includes voltage regulator controller 210. For example, in one embodiment, transistor Q1B and voltage regulator controller 210 are both included together in an integrated circuit, and in another embodiment, transistor Q1B is a discrete off-chip component.

Although FIG. 2 illustrates a particular context for which circuit 100 may be employed, as previously discussed, the invention is not so limited, and embodiments of circuit 100 may be used in other contexts as previously discussed.

Figure 3:
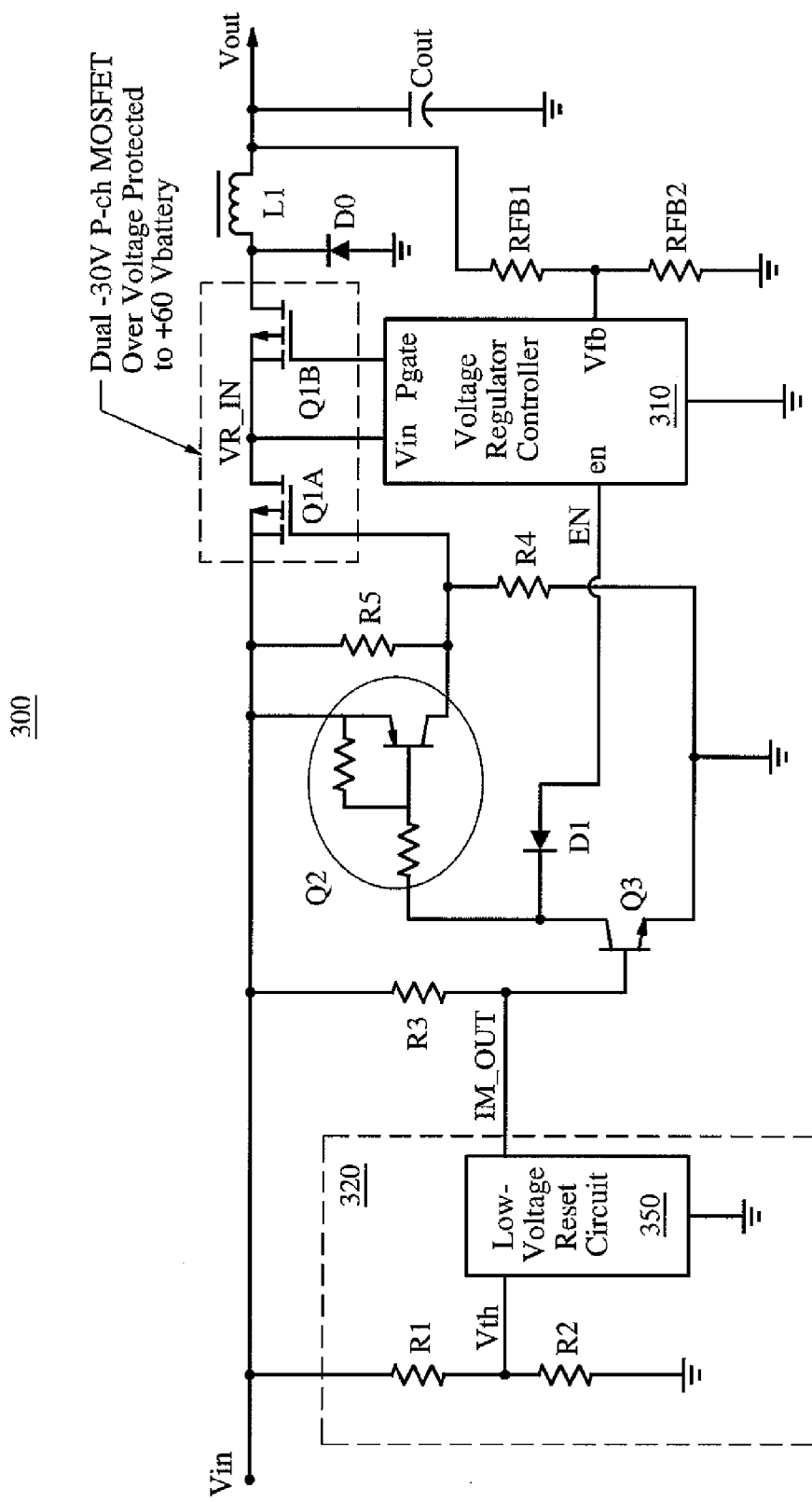
FIG. 3 shows a block diagram of an embodiment of the circuit of FIG. 1, arranged in accordance with aspects of the present invention.

FIG. 3 illustrates a block diagram of an embodiment of circuit 300, which may be employed as an embodiment of circuit 100 of FIG. 1. Circuit 300 may further include switch S1, transistor Q1B, diode D0, capacitor Cout, resistor RFB1, and resistor RFB2, which operate in a similar manner as described above with regard to FIG. 2. Also, circuit 300 may include transistor Q2, transistor Q3, diode D1, and resistors R3-R5. Transistor Q2 is an embodiment of switch S1 of FIG. 2. Input monitor circuit 320 includes resistor R1, resistor R2, and low-voltage reset circuit 350.

Resistors R1 and R2 operate together as a voltage divider to provide threshold voltage Vth from voltage Vin. Further, low-voltage reset circuit 350 is arranged to be in a reset state when threshold Vth is below a reset voltage level (as adjusted by voltage divider and hysteresis), and to be out of the reset state when threshold voltage Vth is above the reset voltage level (as adjusted by voltage divider and hysteresis). For example, in one embodiment, low-voltage reset circuit 350 is in a reset state when threshold voltage Vth is 3.0V or less (as adjusted by hysteresis). In one embodiment, when low-voltage reset circuit 350 is in the reset state, signal IM_OUT is logic low, and when low-voltage reset circuit 350 is out of the reset state, signal IM_OUT is high impedance (e.g. open drain). When low-voltage reset circuit 350 is high impedance, resistor R3 actively turns on transistor Q3. Also, resistors R1 and R2 may be suitably selected in order to select the desired pre-determined level. In the embodiment shown, signal IM_OUT is logic low when low-voltage reset circuit 350 is in the reset state. In one embodiment, R1 is pre-selected as 110 KiloOhms and resistor R2 is pre-selected as 21.7 KiloOhms. In this embodiment, low-voltage reset circuit 350 is reset as long as Vin is 18.2 V or less.

Transistors Q2 and Q3 operate as switches. When low-voltage reset circuit 350 leaves the reset state, resistor R3 turns on Q3, which in turn causes transistor Q2 to turn on. When transistor Q2 turns on, it shorts out the gate-source voltage on transistor Q1A. Additionally, transistor Q3 and diode D1 disable voltage regulator 310 when low-voltage reset circuit 350 leaves the reset state. Accordingly, there is no current flowing across either transistor Q1A or transistor Q1B because the regulator is off.

In one embodiment, as illustrated in FIG. 3, transistors Q1A and Q1B are included together in a dual MOSFET package. However, in other embodiments of circuit 300, transistor Q1B is integrated and included on the same integrated circuit as voltage regulator controller 310. Further, FIG. 3 indicates 30V MOSFETs with over voltage protection to 60V, but this is merely exemplary of one embodiment, and the invention is not so limited.

Resistor R5 is optional. For some applications, it is preferable to keep R5 in the circuit, and for other applications, it is preferable to omit R5 from the circuit.

Diode D1 may be optional depending on the design of voltage regulator controller 710. Depending on the implementation of voltage regulator 710, in some embodiments, diode D1 may be omitted, and the base of Q2 may be directly connected to the enable pin of regulator controller 310.

FIG. 4 shows a block diagram of an embodiment of low-voltage reset circuit 450, which is one embodiment of a low-voltage reset circuit that may be used for low-voltage reset circuit 350 of FIG. 3. Low-voltage reset circuit 450 is a relatively small, simple three-pin integrated circuit with an integrated precision reference voltage, that operates at relatively small voltage (e.g. 1V) and relatively low current (e.g. 1 μA), and is commonly used for resetting digital circuits such as flash memory or a processor, or to indicate low battery voltage or a power failure condition, when the input voltage (e.g. the battery voltage) reaches an under-voltage condition (e.g. the input voltage is below 3.0V, as modified by hysteresis). One example of a low-voltage reset circuit is the LMS33460, available from National Semiconductor Corporation. The LMS33460 has a threshold voltage of 3.0V, with 115 mV of hysteresis. Of course, the low-voltage reset circuit may have more than three pins for purposes outside of the core functionality or may be internally connected. For example, the LMS33460 has five pins. The three primary pins are pin 3 (GND), pin 4 (OUTBAR), and pin 5 (YIN). Pin 1 is internally connected and should not be connected externally, and pin 2 is internally connected to ground, and should be either not connected externally or connected externally to ground. However, LMS33460 is still considered to be a "three-pin device", as that term is used herein, since two of the pins are internally connected.

Figure 5:
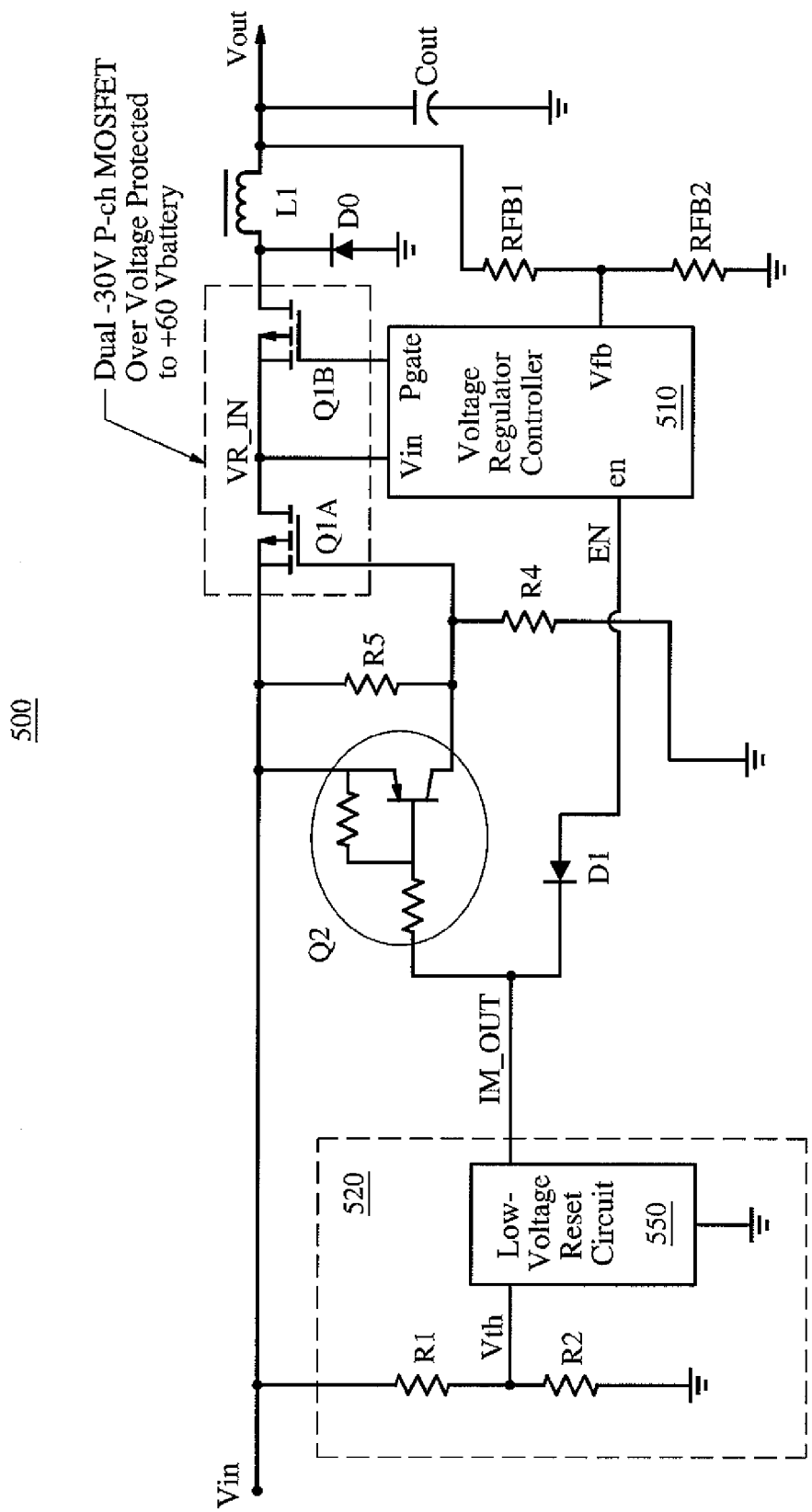
FIG. 5 shows a block diagram of another embodiment of the circuit of FIG. 1, arranged in accordance with aspects of the present invention.

FIG. 5 illustrates a block diagram of an embodiment of circuit 500, which may be employed as an embodiment of circuit 300 of FIG. 3. Circuit 500 is similar to circuit 300 of FIG. 3, albeit different in some ways. In circuit 500, low-voltage reset circuit 550 is an active high (open drain output) low-voltage reset circuit rather than an active low (open drain output) low-voltage reset circuit. By using an active-high (open drain output) low voltage reset, resistor R3 and transistor Q3 may be omitted from the circuit. Transistor Q2 is an embodiment of switch S1 of FIG. 2.

Figure 6:
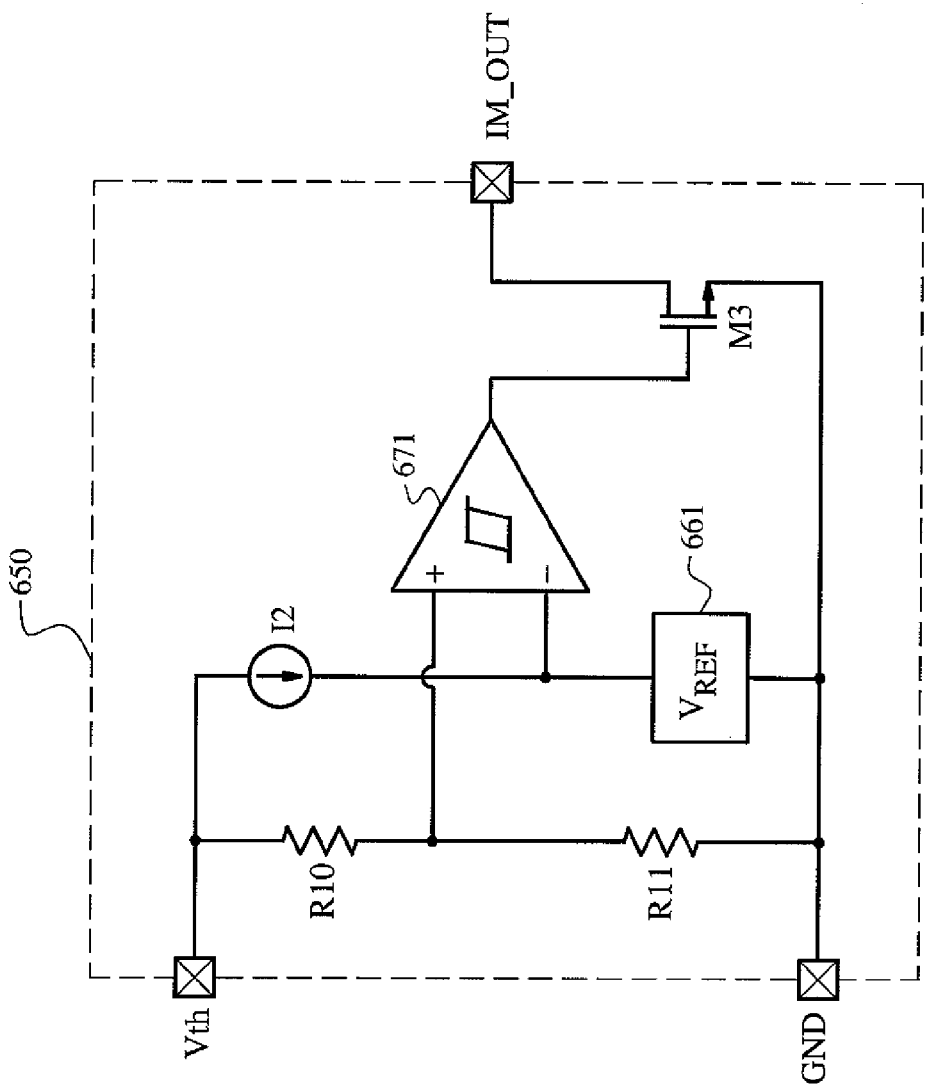
FIG. 6 illustrates a block diagram of an embodiment of the low-voltage reset circuit of FIG. 5.

FIG. 6 shows a block diagram of an embodiment of low-voltage reset circuit 650, which may be employed as an embodiment of low-voltage reset circuit 550 of FIG. 5. Transistor M3 in this embodiment is a high-voltage transistor (e.g. 30V, or greater than the maximum Vin over voltage trip level).

Figure 7:
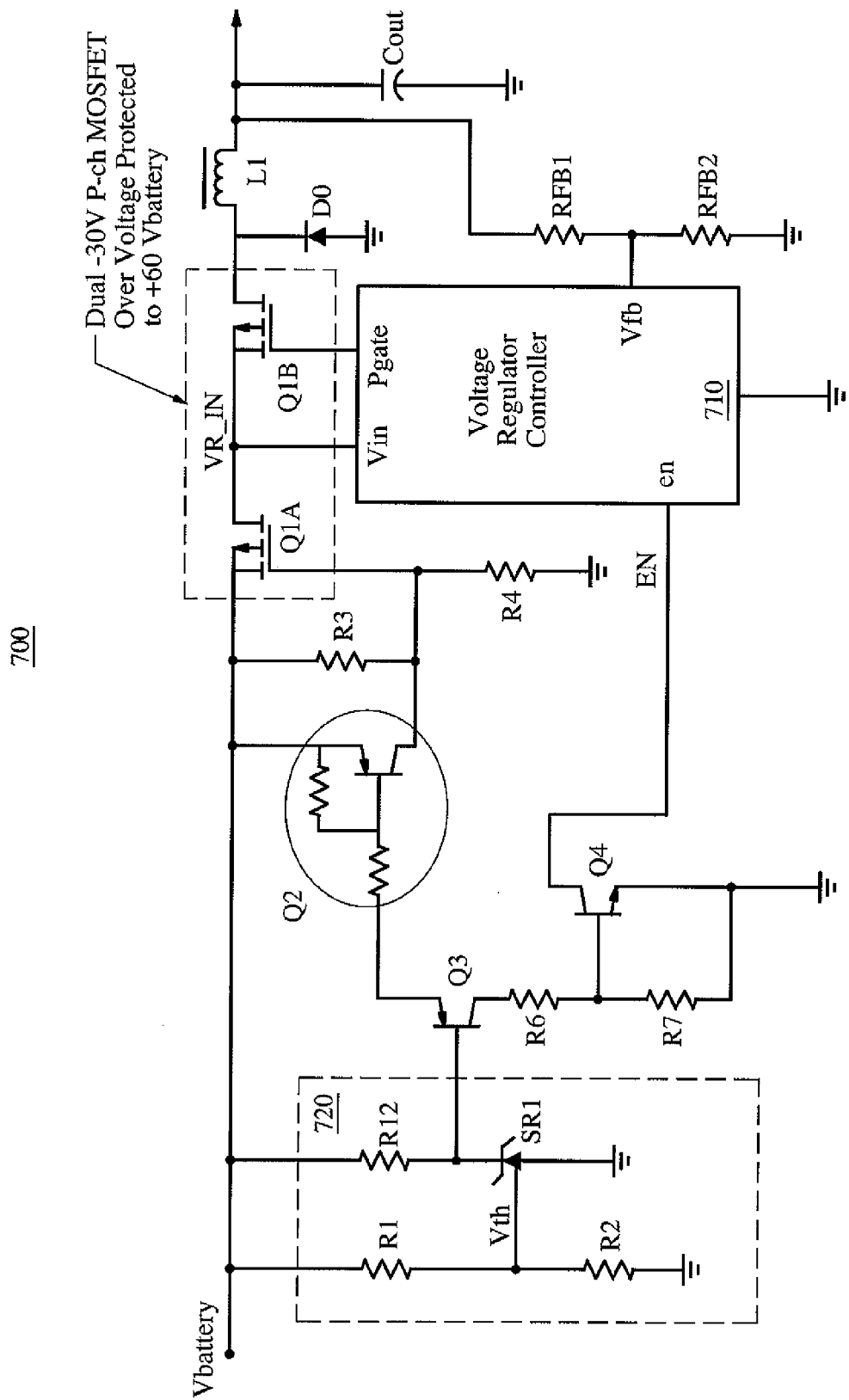
FIG. 7 shows a block diagram of yet another embodiment of the circuit of FIG. 1, arranged in accordance with aspects of the present invention.

FIG. 7 shows a block diagram of an embodiment of circuit 700, which may be employed as an embodiment of circuit 100 of FIG. 1. Circuit 700 further includes resistor R6, resistor R7, and transistor Q4, which operate to provide signal EN. Input monitor circuit 520 includes resistor R1, resistor R2, resistor R12, and adjustable shunt regulator SR1.

Figure 8:
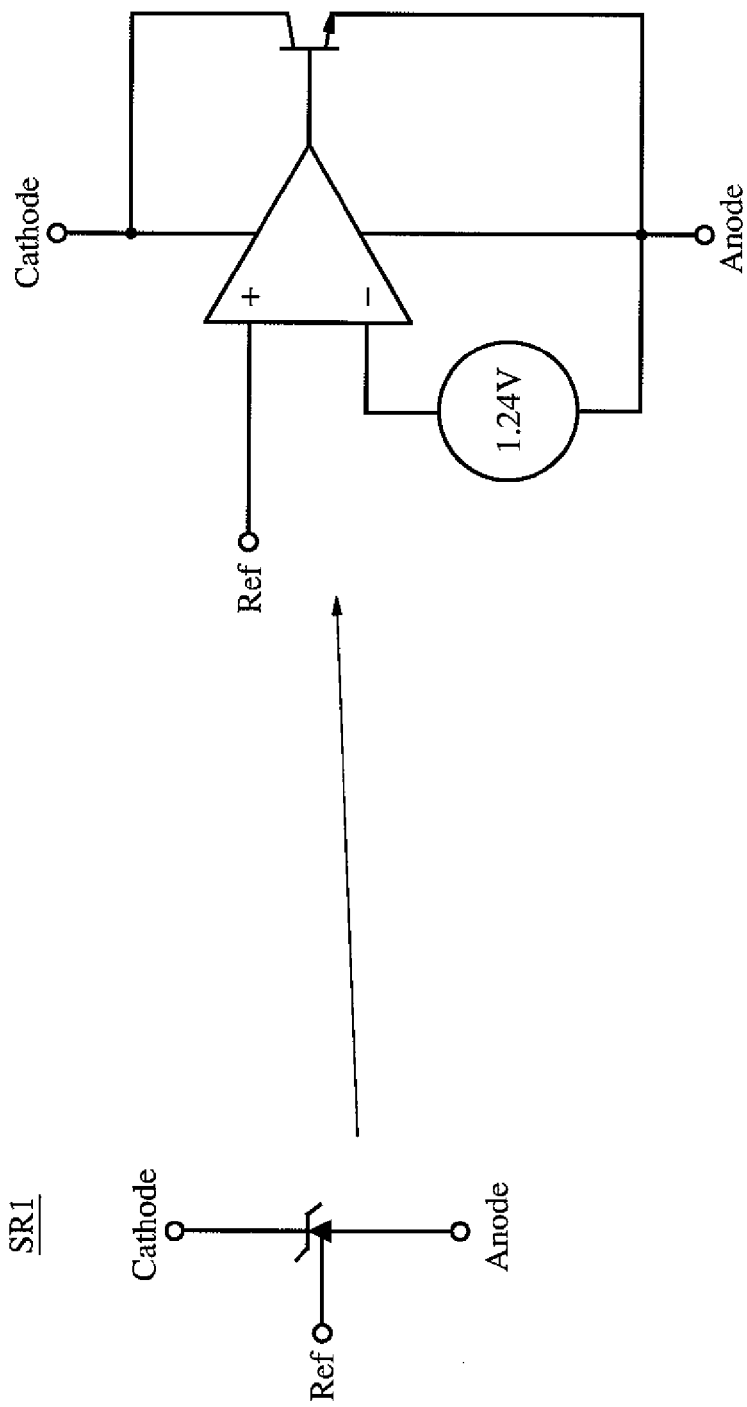
FIG. 8 illustrates a functional diagram of an embodiment of the adjustable shunt regulator SR1 of FIG. 7.

FIG. 8 illustrates a functional diagram of an embodiment of adjustable shunt regulator SR1 of FIG. 7.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for transient voltage protection, comprising:
   an input transistor that is coupled between an input voltage node and a regulator input node, and further coupled to a control node;
   a voltage regulator controller having at least an output, and a voltage input wherein the voltage input of the voltage regulator controller is coupled to the regulator input node; and
   an input monitor circuit that is coupled to the input node, and the control node, wherein the input monitor circuit is arranged to determine whether the input voltage reaches a pre-determined voltage level, and further arranged such that:
   if the input voltage reaches the pre-determined voltage level:
      the input monitor circuit controls the input transistor such the input node is disconnected from the voltage input of the voltage regulator controller; and
      the input monitor circuit causes the voltage regulator controller to be disabled, such that, if the input voltage level reaches the pre-determined voltage level, substantially no current flows through the input transistor even if the input transistor is in a voltage breakdown mode.

2. The circuit of claim 1, further comprising an alternator that is coupled to the input voltage node, wherein the input voltage node is an automotive battery line.

3. The circuit of claim 1, wherein the voltage regulator controller also has at least an enable input, the input monitor circuit is arranged to provide an enable signal to the enable input of the voltage regulator controller, and wherein the input monitor circuit is arranged to cause the voltage regulator controller to be disabled by de-asserting the enable signal if the input voltage reaches the pre-determined voltage level.

4. The circuit of claim 1, wherein the voltage regulator controller also has a feedback input, wherein the input monitor circuit is arranged to cause a voltage at the feedback input to be logic high if the input voltage reaches the pre-determined voltage level.

5. The circuit of claim 1, wherein the input monitor circuit includes a voltage divider and an adjustable shunt regulator.

6. A circuit for transient voltage protection, comprising:
an input transistor that is coupled between an input voltage node and a regulator input node, and further coupled to a control node;
a voltage regulator controller having at least an output, and a voltage input wherein the voltage input of the voltage regulator controller is coupled to the regulator input node; and
an input monitor circuit that is coupled to the input node, and the control node, wherein the input monitor circuit is arranged to determine whether the input voltage reaches a pre-determined voltage level, and further arranged such that:
if the input voltage reaches the pre-determined voltage level:
the input monitor circuit controls the input transistor such the input node is disconnected from the voltage input of the voltage regulator controller; and
the input monitor circuits causes the voltage regulator controller to be disabled, such that, if the input voltage level reaches the pre-determined voltage level, substantially no current flows through the input transistor even if the input transistor is in a voltage breakdown mode, wherein the input monitor circuit includes a voltage divider and a low-voltage reset circuit.

7. The circuit of claim 6, wherein the low-voltage reset circuit is a relatively small three-pin integrated circuit that is capable of operating with an operating voltage of one volt or less and of operating with an operating current of 10 microamps or less, wherein the low-voltage reset circuit includes an integrated voltage reference and an integrated comparator with hysteresis.

8. The circuit of claim 1, wherein the input transistor includes a gate, a drain, and a source, wherein the gate of the input transistor is coupled to the control node, the drain of the input transistor is coupled to the regulator input node, and wherein the source of the input transistor is coupled to the input voltage node.

9. The circuit of claim 8, wherein the input monitor circuit is arranged to disconnect the input node from the voltage input of the voltage regulator controller by substantially shorting the gate of the input transistor to the source of the input transistor if the voltage reaches the pre-determined level.

10. The circuit of claim 8, further comprising a switch that is coupled between the gate of the input transistor and the source of the input transistor, and wherein the input monitor circuit is arranged to disconnect the input node from the voltage input of the voltage regulator controller by closing the switch if the voltage reaches the pre-determined level, and opening the switch otherwise.

11. The circuit of claim 1, wherein the input transistor in conjunction with the input monitor circuit provides voltage protection for the input voltage being up to at least about double the voltage rating of the input transistor.

12. The circuit of claim 11, wherein the voltage regulator is rated for about thirty volts, the input transistor is rated at thirty volts, and wherein the input transistor in conjunction with the input monitor circuit provides voltage protection for the input voltage being up to at least sixty volts.

13. A circuit for transient voltage protection, comprising:
an input transistor having at least a gate, a drain, and a source;
a voltage regulator controller having at least a voltage input, an enable input, and an output, wherein the voltage input of the voltage regulator controller is coupled to the drain of the input transistor;
an input monitor circuit that is coupled to the source of the input transistor, the gate of the input transistor, and the enable input of the voltage regulator controller, wherein the input monitor circuit is arranged to determine whether an input voltage at the source of the input transistor reaches a pre-determined voltage level, and further arranged such that:
if the input voltage reaches the pre-determined voltage level:
the input monitor circuit controls the input transistor such the input voltage is disconnected from the voltage input of the voltage regulator controller; and
an enable signal that is provided to the enable input of the voltage regulator controller is de-asserted such that the voltage regulator controller is disabled, such that substantially no current flows through the input transistor even if the input transistor is in a voltage breakdown mode.

14. The circuit of claim 13, further comprising a switch that is coupled between the gate of the input transistor and the source of the input transistor, and wherein the input monitor circuit is arranged to disconnect the input node from the voltage input of the voltage regulator controller by closing the switch if the voltage reaches the pre-determined level, and opening the switch otherwise.

15. The circuit of claim 13, wherein the input monitor circuit includes a voltage divider and a low-voltage reset circuit.

16. The circuit of claim 13, wherein the input monitor circuit includes a voltage divider and an adjustable shunt regulator.

17. A method for transient voltage protection, comprising:
determining whether an input voltage teaches a pre-determined voltage level;
if the input voltage reaches the pre-determined voltage level:
controlling an input transistor such that the input voltage is disconnected from a voltage regulator; and
disabling the voltage regulator such that the input transistor draws substantially no current even if the input transistor is in a voltage breakdown mode.

18. The method of claim 17, wherein controlling the input transistor such that the input voltage is connected from a voltage regulator includes substantially shorting the gate of the input transistor to the source of the input transistor if the input voltage reaches the pre-determined voltage level.

19. The method of claim 17, wherein disabling the voltage regulator such that the input transistor draws substantially no current even if the input transistor is in a voltage breakdown mode includes de-asserting an enable signal that is provided to an enable pin of the voltage regulator.

20. The method of claim 17, wherein disabling the voltage regulator such that the input transistor draws substantially no current even if the input transistor is in a voltage breakdown mode includes causing a feedback voltage at a feedback pin of the voltage regulator to correspond to a logic high.

21. The method of claim 6, wherein the low-voltage reset circuit includes an integrated voltage reference and an integrated comparator with hysteresis.

* * * * *

UNITED STATES PATENT AND TRADEMARK OFFICE
CERTIFICATE OF CORRECTION

PATENT NO.       : 7,800,869 B1
APPLICATION NO.  : 11/845691
DATED            : September 21, 2010
INVENTOR(S)      : Kevin Michael Daugherty Page 1 of 1

It is certified that error appears in the above-identified patent and that said Letters Patent is hereby corrected as shown below:

Title page, Item (56), under "Other Publications", in column 2, line 17, delete "autombiles" and insert -- automobiles --, therefor.

In column 6, line 43, in claim 1, after "such" insert -- that --.

In column 7, line 17, in claim 6, after "such" insert -- that --.

In column 8, line 15, in claim 13, after "such" insert -- that --.

In column 8, line 38, in claim 17, delete "teaches" and insert -- reaches --, therefor.

Signed and Sealed this
Nineteenth Day of April, 2011

David J. Kappos
*Director of the United States Patent and Trademark Office*